United States Patent
Xiao et al.

(10) Patent No.: US 9,573,113 B2
(45) Date of Patent: Feb. 21, 2017

(54) HOLLOW TUBULAR OIL ABSORBING MATERIAL AND PREPARING METHOD THEREOF

(71) Applicant: TIANJIN POLYTECHNIC UNIVERSITY, Tianjin (CN)

(72) Inventors: Changfa Xiao, Tianjin (CN); Zitao Wang, Tianjin (CN); Jian Zhao, Tianjin (CN); Xiao Hu, Tianjin (CN); Qinglin Huang, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 0 days.

(21) Appl. No.: 14/778,102

(22) PCT Filed: Oct. 28, 2014

(86) PCT No.: PCT/CN2014/089679
§ 371 (c)(1),
(2) Date: Sep. 18, 2015

(87) PCT Pub. No.: WO2016/011721
PCT Pub. Date: Jan. 28, 2016

(65) Prior Publication Data
US 2016/0256849 A1    Sep. 8, 2016

(30) Foreign Application Priority Data
Jul. 22, 2014 (CN) .......................... 2014 1 0348578

(51) Int. Cl.
*B01J 20/32* (2006.01)
*B01J 20/02* (2006.01)
*B01J 20/22* (2006.01)
*B01J 20/28* (2006.01)
*B01J 20/30* (2006.01)
*B01J 20/26* (2006.01)

(52) U.S. Cl.
CPC ............ *B01J 20/0262* (2013.01); *B01J 20/22* (2013.01); *B01J 20/26* (2013.01); *B01J 20/28* (2013.01); *B01J 20/28054* (2013.01); *B01J 20/30* (2013.01); *B01J 20/3206* (2013.01); *B01J 20/3208* (2013.01); *B01J 20/3234* (2013.01)

(58) Field of Classification Search
CPC ........................................................ B01J 20/32
USPC ....................................................... 502/402
See application file for complete search history.

(56) References Cited

U.S. PATENT DOCUMENTS 4,209,401 A * 6/1980 Henton .................. B01D 17/00
210/136

* cited by examiner

*Primary Examiner* — Edward Johnson

(57) ABSTRACT

A hollow tubular oil absorbing material includes: a core formed by a spring, and an outer shell formed by a flat sponge wrapped at the spring; wherein the flat sponge is fixed at both ends of the spring; the flat sponge fully covers all the spring or is sealed at a first end; a connecting tube is connected at a second end of the spring for communicating with a vacuum pump; a graphene oxide layer is coated at the outer sponge. The graphene oxide layer on the flat sponge of hollow tubular oil absorbing material is formed by immersion and coating under negative pressure. Further the reduction of graphene oxide is performed with hydrazine hydrate steam and followed by washing and drying. Finally, a hollow tubular oil absorbing material with a spring core and an outer grapheme-coated sponge structure is obtained, which can be applied to continuous oil-water separation.

9 Claims, 3 Drawing Sheets

HOLLOW TUBULAR OIL ABSORBING MATERIAL AND PREPARING METHOD THEREOF

CROSS REFERENCE OF RELATED APPLICATION

This is a U.S. National Stage under 35 U.S.0 371 of the International Application PCT/CN2014/089679, filed Oct. 28, 2014, which claims priority under 35 U.S.C. 119(a-d) to CN 201410348578.6, filed Jul. 22, 2014.

BACKGROUND OF THE PRESENT INVENTION

Field of Invention

The present invention relates to an absorbing material, and more particularly to a hollow tubular oil absorbing material and a preparing method thereof.

Description of Related Arts

In recent years, oil leakage accidents occur frequently, causing serious river and ocean pollution. Oily waste water with industrial organic contaminants greatly harm aquatic plants, animals and human beings, which need to be disposed for realizing harmless treatment. In order to solve the environmental problem, new materials and methods to meet the requirements of waste oil recycling (Shannon M A, Bohn P W, Elimelech M, Georgiadis J G, Marinas B J and Mayes A M. *Science and technology for water purification in the coming decades. Nature*, 2008, 452(7185), 301-310) have been explored. Graphene has a two-dimensional crystal structure formed by close-packed monoatomic layer, wherein a single layer of graphene is easy to fold to form tiny projections on the surface thereof, in such a manner that the graphene has a large surface area, great hydrophobicity, etc. Researchers take advantage of the excellent properties of graphene, and apply the graphene to oil absorbing for developing a number of graphene-based oil absorbing materials (Zhang X, Wan S, Pu J, Wang L, Liu X *Highly hydrophobic and adhesive performance of graphene films. Journal of Materials Chemistry*, 2011, 21(33), 12251-12258). Nguyen et al. immobilized graphene on melamine sponge, thereby preparing graphene-based sponge with good absorbing capacity and oil-water selectivity, wherein the absorption capacity is up to 165 times of its own weight (Nguyen D D, Tai N-H, Lee S-B, Kuo W-S. *Superhydrophobic and superoleophilic properties of graphene-based sponges fabricated using a facile dip coating method. Energy & Environmental Science*, 2012, 5(7), 7908-7912). Gao et al. prepared a carbon aerogel by freeze-drying the mixed solution of graphene oxide and carbon nanotube, and followed by hydrazine reduction. According to the research, it is found that carbon aerogel has a good absorbing performance on different oils (Sun H, Xu Z, and Gao C. *Multifunctional, Ultra-Flyweight, Synergistically Assembled Carbon Aerogels. Advanced Materials*, 2013, 25(18), 2554-2560). Graphene-based oil absorbing material has high hydrophobicity and excellent lipophilicity, which is competent to oil-water separation. However, the shortcomings are of high costs, short usage life, intermittent absorption-desorption process, and these materials cannot afford continuous running for oily wastewater treatment.

SUMMARY OF THE PRESENT INVENTION

For overcoming the above technical issues, an object of the present invention is to provide a hollow tubular oil absorbing material and a preparing method thereof. The preparing method is easy-to-operate. The low-cost hollow tubular oil absorbing material is able to continuously work, which can improve efficiency of oil-water separation.

Accordingly, in order to accomplish the above object, the present invention provides:

a hollow tubular oil absorbing material, comprising: a core formed by a spring, and an outer shell formed by a flat sponge wrapped at the spring; wherein the flat sponge is fixed at both ends of the spring; the flat sponge fully covers all the spring or is sealed at a first end; a connecting tube is connected at a second end of the spring for communicating with a vacuum pump; a graphene oxide layer is coated at the outer sponge.

A preparing method of a hollow tubular oil absorbing material is also provided, comprising steps of:

1) wrapping a surface of a spring with a flat sponge, and fixing the sponge at both ends of the spring, wherein the flat sponge fully covers a top portion of the spring or is sealed at a first end; a connecting tube is connected at a second end of the spring for obtaining a hollow tubular sponge with a spring core and an outer sponge shell structure;

2) obtaining graphene oxide dispersion in water;

3) connecting the connecting tube of the hollow tubular sponge obtained in the step 1) to a vacuum pump, then fully immersing the hollow tubular sponge in the graphene oxide dispersion obtained in the step 2); generating a negative pressure at the hollow tubular sponge for 1-3 min by the vacuum pump, for obtaining a graphene-oxide-coated hollow tubular sponge; and 4) vacuum-drying the graphene-oxide-coated hollow tubular sponge obtained in the step 3) to a constant weight with a constant temperature of 30-40° C., and reduction-treating in 80-90° C. hydrazine hydrate steam for 12-24 h, and followed by washing with distilled water and vacuum-drying, wherein the hollow tubular oil absorbing material is obtained.

In the step 1), the flat sponge is fixed on the spring by resin casting.

In the step 1), a porosity of the flat sponge is 85-95%.

In the step 1), the sponge is alternately a polyurethane sponge or a melamine sponge.

In the step 2), a concentration of the graphene oxide dispersion is 1-3 mg/mL.

In the step 3), the negative pressure is a range of (-0.05) to (-0.1) MPa.

In the step 2), the graphene oxide is treated with ultrasonic dispersion in the water for the graphene oxide dispersion, wherein an ultrasonic frequency is 30-60 kHz, and a work time is set for 30-120 min.

In the step 1), the spring is a stainless steel spring.

In the step 1), a thickness of the flat sponge is 3-9 mm.

In the step 4), a vacuum-drying condition has a temperature range of 20 to 90° C. for 12-24 h.

Compared with the conventional techniques, the present invention has advantages as follows.

1) According to the present invention, a principle of preparing the hollow tubular oil absorbing material by vacuum-absorbing is as follows: through vacuum-absorbing, the graphene oxide is induced to self-assemble on the surface of the sponge for forming the graphene oxide layer, which increases anchor points of the graphene on the sponge, for effectively improving interfacial bonding and reusability of a graphene-based sponge. Graphene absorbing layer on the surface of the sponge is hydrophobic and lipophilic, which is able to absorbing oil or separating oil from water. With respect to previously reported graphene-based oil absorbing materials, the preparing method is simple, and low-cost due to cheap sponge as a matrix, and reusable with enhanced coating by vacuum-absorbing.

2) When the hollow tubular oil absorbing material is put into an oil-water mixture and a negative pressure is provided at one end, dynamic continuous absorption and separation are achieved, which greatly improve oil-water separation efficiency, and it can be applied to oil-water separation, especially in large workload such as industrial organic wastewater and marine oil spills. Furthermore, the hollow tubular oil absorbing material with high absorption capacity is able to continuously work for oil water separation, and has great practical value in the field of environmental protection and energy.

DETAILED DESCRIPTION OF THE PREFERRED EMBODIMENT

Accompany to drawings and preferred embodiments, the present invention is further illustrated as following:

Preferred Embodiment 1

Figure 1:
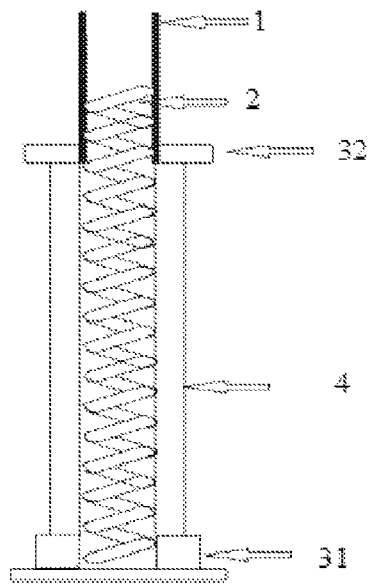
FIG. 1 is a schematic diagram of a hollow tubular oil absorbing material according to the present invention.

A preparing method of a hollow tubular oil absorbing material, comprises steps of:

1) wrapping a surface of a stainless steel spring with a polyurethane flat sponge with a thickness of 3 mm (wherein a porosity thereof is 85%), wherein a wire diameter of the stainless steel spring has a wire diameter thereof 0.5 mm, an outer diameter thereof 3 mm and a length thereof is 30 cm; and fixing the sponge at both ends of the spring by resin casting, wherein the spring and the sponge are sealed at the first end; a connecting tube is connected at the second end of the spring for communicating with a vacuum pump and obtaining a hollow tubular sponge with a spring core and an outer sponge shell structure;

2) dispersing graphene oxide in a ultrasonic washer at a frequency of 40 kHz for 30 min, for obtaining graphene oxide dispersion with a concentration of 2 mg/mL;

3) connecting the connecting tube of the hollow tubular sponge obtained in the step 1) to the vacuum pump, then fully immersing the hollow tubular sponge in the graphene oxide dispersion obtained in the step 2); generating a negative pressure of −0.1 MPa at the inner hollow tubular sponge for 3 min by the vacuum pump, for obtaining a graphene-oxide-coated hollow tubular sponge; and 4) vacuum-drying the graphene-oxide-coated hollow tubular sponge obtained in the step 3) to a constant weight with a constant temperature of 40° C. for 24 h, and reduction-treating in 80° C. hydrazine hydrate steam for 24 h, and followed by washing with distilled water and vacuum drying, so as to obtain the hollow tubular oil absorbing material, wherein a structure thereof is shown in FIG. 1. A hollow tubular oil absorbing material comprises: a core formed by a spring 2, and an outer sponge formed by a flat sponge 4 wrapped at an the spring 2 and fixed the sponge at a first end 31 and a second end 32 of the spring; wherein the flat sponge 4 fully covered all the spring 2 or sealed at the first end 31; a connecting tube 1 is connected at the second end 32 of the spring 2 for communicating with a vacuum pump; a graphene oxide layer is coated at the surface of the sponge (wherein because graphene oxide permeates into the sponge 4, the graphene oxide layer on the sponge is too thin to be shown in the drawings).

Figure 2:
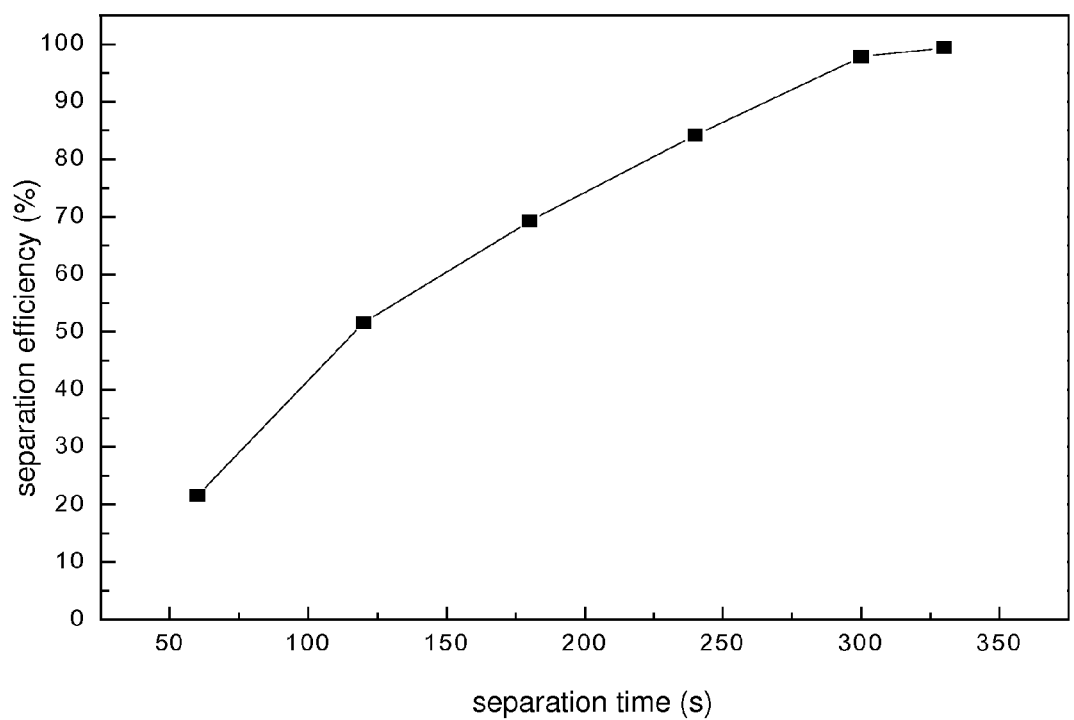
FIG. 2 illustrates toluene/water mixture separation with a hollow tubular oil absorbing material prepared in a preferred embodiment 1.

Application Experiment (1) Putting the hollow tubular oil absorbing material prepared in the preferred embodiment 1 into 2 L toluene/water mixture (wherein a volume ratio thereof is 1:1), connecting the connecting tube of the hollow tubular oil absorbing material to the vacuum pump, generating a negative pressure of −0.05 MPa by the vacuum pump for the toluene/water mixture separation; wherein separation efficiency of the hollow tubular oil absorbing material is calculated by:

$$\text{Separation efficiency} = V_T/V_o \times 100\%$$

wherein $V_T$ is the volume of oil collected at a time t, $V_o$ is the original volume of oil; wherein the results are shown in FIG. 2, the X-axis represents separation time and the Y-axis represents separation efficiency.

As shown in FIG. 2, the separation efficiency of the hollow tubular oil absorbing material to the toluene/water mixture is above 99%. Oil can be removed from water.

Figure 3:
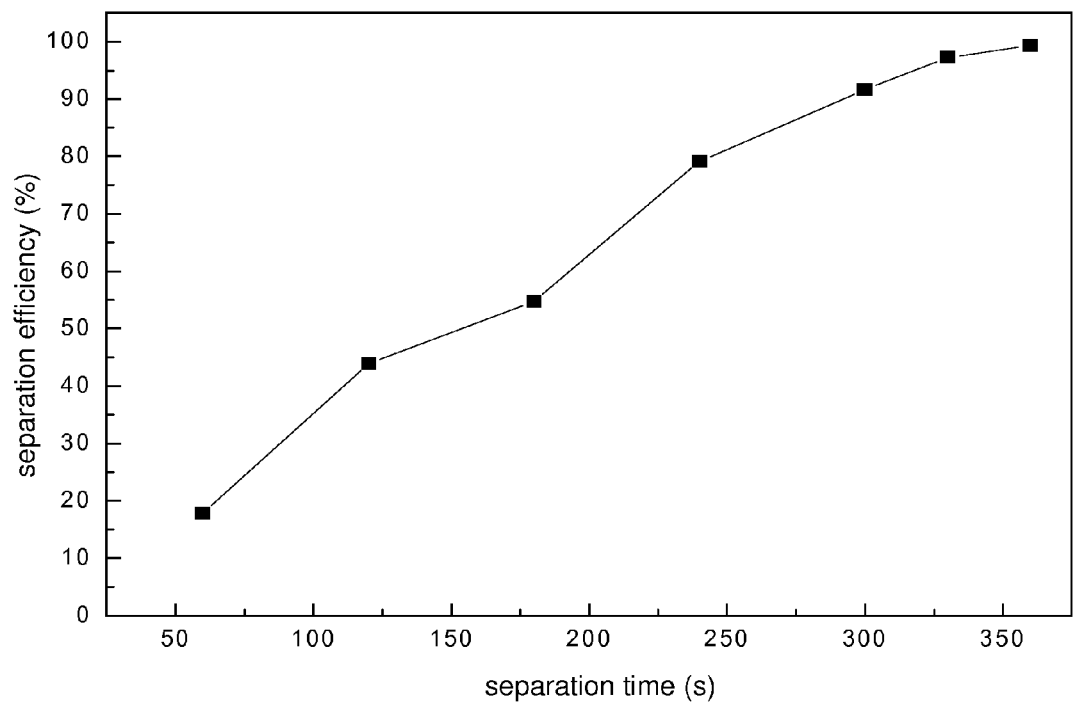
FIG. 3 illustrates the kerosene/water mixture separation with a hollow tubular oil absorbing material prepared in the preferred embodiment 1.

(2) Kerosene/water mixture (wherein a volume ratio thereof is 1:1) separation with the hollow tubular oil absorbing material prepared in the preferred embodiment 1, wherein the results are shown in FIG. 3, X-axis represents separation time and Y-axis represents separation efficiency.

As shown in FIG. 3, the separation efficiency of the hollow tubular oil absorbing material to the kerosene/water mixture is above 99%. Kerosene can be removed from water.

Figure 4:
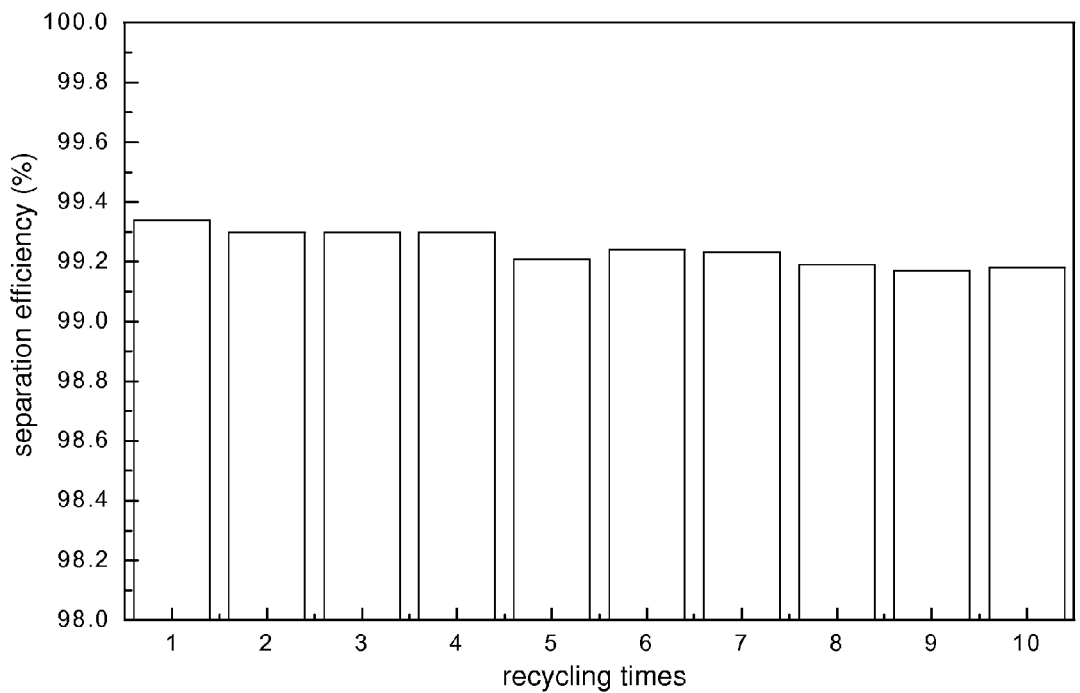
FIG. 4 illustrates recycling conditions of a hollow tubular oil absorbing material prepared in the preferred embodiment 1 for the toluene/water mixture separation.

(3) The reusability of the hollow tubular oil absorbing material prepared in the preferred embodiment 1 for the toluene/water mixture separation (wherein a volume ratio thereof is 1:1) was investigated; wherein a condition of desorption is: the hollow tubular oil absorbing material with toluene absorbed thereon in a sealed container, and vacuuming the container with the vacuum pump for lowering a pressure in the container, in such a manner that the toluene can be desorbed; after desorption, the hollow tubular oil absorbing material was applied to next toluene/water mixture separation; repeat the process for 10 times. FIG. 4 illustrates the reusability of the hollow tubular oil absorbing material, wherein X-axis represents recycling times (10 times repeat); and Y-axis represents separation efficiency.

As shown in FIG. 4, after using the hollow tubular oil absorbing material in the toluene/water mixture for 10 times, the separation efficiency still keeps above 99%.

Figure 5:
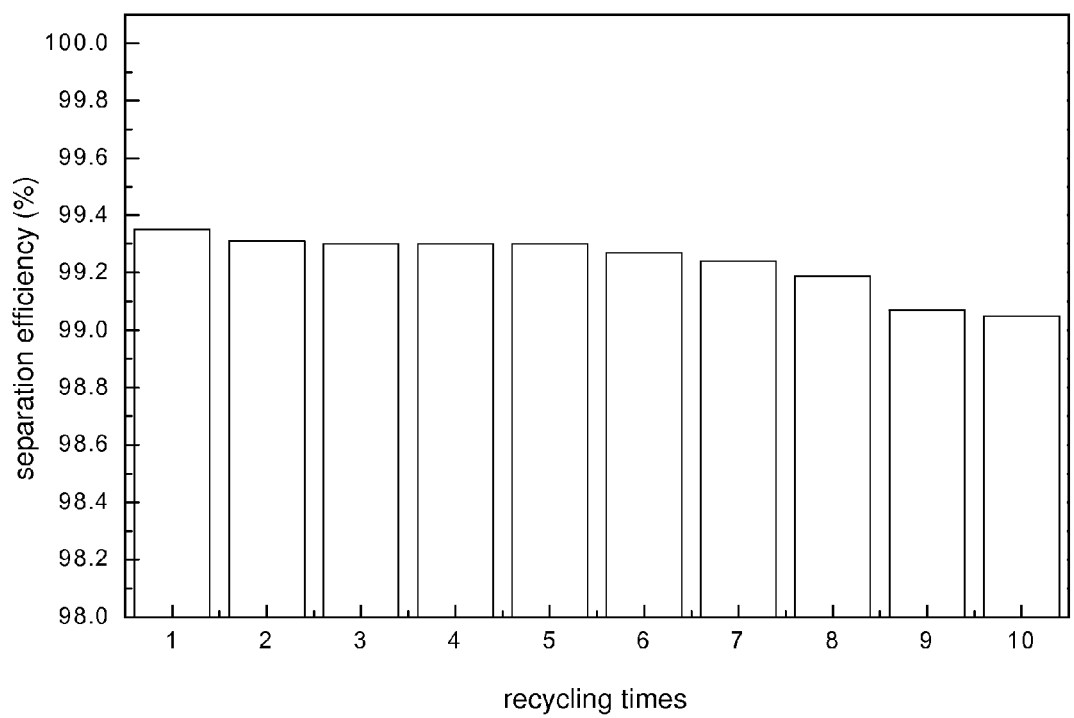
FIG. 5 illustrates recycling conditions of a hollow tubular oil absorbing material prepared in the preferred embodiment 1 for the kerosene/water mixture separation.

(4) The reusability of the hollow tubular oil absorbing material prepared in the preferred embodiment 1 for the kerosene/water mixture separation (wherein a volume thereof is 2 L, a volume ratio thereof is 1:1). FIG. 5 illustrates the reusability of the hollow tubular oil absorbing material, wherein X-axis represents recycling times (10 times repeat); and Y-axis represents separation efficiency.

As shown in FIG. 5, after using the hollow tubular oil absorbing material in the toluene/water mixture for 10 times, the separation efficiency still retained above 99%.

Preferred Embodiment 2

A preparing method of a hollow tubular oil absorbing material is different from the preparing method of the preferred embodiment 1 in that: in the step 1), a porosity of the polyurethane flat sponge is 95%. There is no other difference, and experiment results are similar to the ones in the preferred embodiment 1.

Preferred Embodiment 3

A preparing method of a hollow tubular oil absorbing material is different from the preparing method of the preferred embodiment 1 in that: in the step 1), a flat sponge is a melamine sponge, and its porosity is 85%. There is no other difference, and experiment results are similar to the ones in the preferred embodiment 1.

Preferred Embodiment 4

A preparing method of a hollow tubular oil absorbing material is different from the preparing method of the preferred embodiment 1 in that: in the step 1), a flat sponge is a melamine sponge, and its porosity is 95%. There is no other difference, and experiment results are similar to the ones in the preferred embodiment 1.

Preferred Embodiment 5

A preparing method of a hollow tubular oil absorbing material is different from the preparing method of the preferred embodiment 1 in that: in the step 1), a flat sponge is a polyurethane sponge, and its thickness is 6 mm. There is no other difference, and experiment results are similar to the ones in the preferred embodiment 1.

Preferred Embodiment 6

A preparing method of a hollow tubular oil absorbing material is different from the preparing method of the preferred embodiment 1 in that: in the step 2), the concentration of graphene oxide is 1 mg/mL. There is no other difference, and experiment results are similar to the ones in the preferred embodiment 1.

Preferred Embodiment 7

A preparing method of a hollow tubular oil absorbing material is different from the preparing method of the preferred embodiment 1 in that: in the step 2), the concentration of graphene oxide is 3 mg/mL. There is no other difference, and experiment results are similar to the ones in the preferred embodiment 1.

Preferred Embodiment 8

A preparing method of a hollow tubular oil absorbing material is different from the preparing method of the preferred embodiment 1 in that: in the step 2), the time of ultrasonic treatment is 120 min. There is no other difference, and experiment results are similar to the ones in the preferred embodiment 1.

Preferred Embodiment 9

A preparing method of a hollow tubular oil absorbing material is different from the preparing method of the preferred embodiment 1 in that: in the step 3), the negative pressure of −0.1 MPa at a hollow tubular sponge is generated by a vacuum pump for 1 min. There is no other difference, and experiment results are similar to the ones in the preferred embodiment 1.

Preferred Embodiment 10

A preparing method of a hollow tubular oil absorbing material is different from the preparing method of the preferred embodiment 1 in that: in the step 3), a negative pressure of −0.05 MPa at a hollow tubular sponge is generated by a vacuum pump for 3 min. There is no other difference, and experiment results are similar to the ones in the preferred embodiment 1.

Preferred Embodiment 11

A preparing method of a hollow tubular oil absorbing material is different from the preparing method of the preferred embodiment 1 in that: in the step 3), a negative pressure of −0.05 MPa at a hollow tubular sponge is generated by a vacuum pump for 1 min. Experiment results are similar to the ones in the preferred embodiment 1.

Preferred Embodiment 12

A preparing method of a hollow tubular oil absorbing material is different from the preparing method of the preferred embodiment 1 in that: in the step 4), reduction-treatment is performed in hydrazine hydrate steam at 90° C. for 12 h. Experiment results are similar to the ones in the preferred embodiment 1.

Preferred Embodiment 13

A preparing method of a hollow tubular oil absorbing material is different from the preparing method of the preferred embodiment 1 in that: in the step 4), reduction-treatment is performed in hydrazine hydrate steam at 90° C. for 24 h. Experiment results are similar to the ones in the preferred embodiment 1.

Preferred Embodiment 14

A preparing method of a hollow tubular oil absorbing material is different from the preparing method of the preferred embodiment 1 in that: in the step 4), reduction-treatment is performed in hydrazine hydrate steam at 80° C. for 12 h. Experiment results are similar to the ones in the preferred embodiment 1.

What is claimed is:
1. A hollow tubular oil absorbing material, comprising: a core formed by a spring, and a outer shell formed by a flat sponge wrapped at the spring; wherein the flat sponge is fixed at both ends of the spring; the flat sponge fully covers all the spring or is sealed at a first end; a connecting tube is connected at a second end of the spring for communicating with a vacuum pump; a graphene oxide layer is coated at the outer sponge.

2. A preparing method of a hollow tubular oil absorbing material, comprising steps of:
1) wrapping a surface of a spring with a flat sponge, and fixing the sponge at both ends of the spring, wherein the flat sponge fully covers a top portion of the spring or is sealed at a first end; a connecting tube is connected at a second end of the spring for obtaining a hollow tubular sponge with a spring core and an outer sponge shell structure;
a connecting tube is connected at the second end of the spring for obtaining a hollow tubular sponge with a spring core and an outer sponge shell structure;
2) obtaining graphene oxide dispersion in water;
3) connecting the connecting tube of the hollow tubular sponge obtained in the step 1) to a vacuum pump, then fully immersing the hollow tubular sponge in the graphene oxide dispersion obtained in the step 2); generating a negative pressure at the hollow tubular sponge for 1-3 min by the vacuum pump, for obtaining a graphene-oxide-coated hollow tubular sponge; and
4) vacuum-drying the graphene-oxide-coated hollow tubular sponge obtained in the step 3) to a constant weight with a constant temperature of 30-40° C., and reduction-treating in 80-90° C. hydrazine hydrate steam for 12-24 h, and followed by washing with distilled water and vacuum-drying, wherein the hollow tubular oil absorbing material is obtained.

3. The preparing method, as recited in claim 2, wherein in the step 1), the flat sponge is fixed on the spring by resin casting.

4. The preparing method, as recited in claim 2, wherein in the step 1), a porosity of the flat sponge is 85-95%.

5. The preparing method, as recited in claim 2, wherein in the step 1), the sponge is alternately a polyurethane sponge or a melamine sponge.

6. The preparing method, as recited in claim 2, wherein in the step 2), a concentration of the graphene oxide dispersion is 1-3 mg/mL.

7. The preparing method, as recited in claim 2, wherein in the step 3), the negative pressure is a range of (−0.05) to (−0.1) MPa.

8. The preparing method, as recited in claim 2, wherein in the step 2), the graphene oxide is treated with ultrasonic dispersion in the water for obtaining the graphene oxide dispersion.

9. The preparing method, as recited in claim 8, wherein an ultrasonic frequency is 30-60 kHz, and a work time is set for 30-120 min.

* * * * *